(12) United States Patent
Phan et al.

(10) Patent No.: US 11,313,405 B2
(45) Date of Patent: Apr. 26, 2022

(54) CAPTIVE FASTENER WITH TRIPLE CLIP

(71) Applicant: FASTENER TECHNOLOGY CORPORATION, N. Hollywood, CA (US)

(72) Inventors: Benjamin Phan, Arcadia, CA (US); Simon Ly, Rosemead, CA (US); An Tran, Rosemead, CA (US); Patrick Tran, Arcadia, CA (US); Yuriy Bern, No. Hollywood, CA (US); Larisa Zilber, Northridge, CA (US); Jeffrey Hang, Rosemead, CA (US); Dennis Suedkamp, Porter Ranch, CA (US)

(73) Assignee: FASTENER TECHNOLOGY CORPORATION, North Hollywood, CA (US)

(*) Notice: Subject to any disclaimer, the term of this patent is extended or adjusted under 35 U.S.C. 154(b) by 236 days.

(21) Appl. No.: 16/834,610

(22) Filed: Mar. 30, 2020

(65) Prior Publication Data

US 2020/0392980 A1    Dec. 17, 2020

Related U.S. Application Data

(60) Provisional application No. 62/861,118, filed on Jun. 13, 2019.

(51) Int. Cl.
*F16B 39/06*    (2006.01)
*F16B 41/00*    (2006.01)

(52) U.S. Cl.
CPC ................ *F16B 41/002* (2013.01)

(58) Field of Classification Search
CPC ........................................ F16B 41/002
See application file for complete search history.

(56) References Cited

U.S. PATENT DOCUMENTS

| 238,340 | A | * | 3/1881 | Bunker |
| 365,165 | A | * | 6/1887 | Campbell et al. |
| 893,066 | A | * | 7/1908 | Fletcher et al. |
| 910,954 | A | * | 1/1909 | Pounds |
| 973,460 | A | * | 10/1910 | Rank |
| 998,290 | A | * | 7/1911 | Hanson et al. |
| 1,047,542 | A | * | 12/1912 | Lofland .................. F16B 39/06 411/322 |
| 1,108,866 | A | * | 8/1914 | Messner ................. F16B 39/06 411/322 |
| 1,129,787 | A | * | 2/1915 | Bright .................... F16B 39/06 411/322 |
| 1,178,041 | A | * | 4/1916 | Wallace ................. F16B 39/06 411/322 |

(Continued)

*Primary Examiner* — Gary W Estremsky
(74) *Attorney, Agent, or Firm* — Fulwider Patton LLP

(57) ABSTRACT

A captive fastener is disclosed having a longitudinal slot along the shank for receiving a hold out clip, and a pair of diametrically opposed slots for receiving a pair of push out clips. The push out clips are formed with hook shaped ends that catch and engage an edge of a wall surface to set the distance of depth of the fastener inside the wall. The hold out clip and push out clips are shaped to receded inside their respective slots in the presence of an interfering surface as the fastener passes through the wall in a first direction (insertion), but the push out clips will not recede into their slots in the second direction (withdrawal).

5 Claims, 5 Drawing Sheets

(56) References Cited

U.S. PATENT DOCUMENTS 1,199,448 A * 9/1916 Burnett .................. F16B 39/06
                                                411/322
1,387,172 A * 8/1921 Postel .................... F16B 39/32
                                                411/322
1,666,608 A * 4/1928 Sarazin ................. F16B 39/06
                                                411/322

* cited by examiner

CAPTIVE FASTENER WITH TRIPLE CLIP

CROSS-REFERENCES TO RELATED APPLICATIONS

This application claims priority from U.S. Provisional Patent Application No. 62/861,118, filed Jun. 13, 2019, the content of which is incorporated by reference herein in its entirety.

BACKGROUND

Captive screws are used for many applications, including securing panels and walls where it is challenging to access the opposite side of the screw assembly. Captive screw assemblies are typically comprised of a captive screw, along with flat washer &/or lock washer or retainer. Threads on captive screws are eliminated under the head for a portion of the length, so that once the threaded portion extends through a panel with a washer on the other side, the screw will not fall out. Captive screws are most often used to secure panels because, if loosened, the fastener will still remain in the panel. When coupled with a lock washer and/or captive washer, they provide a broader fastening surface to the panel, while inhibiting the screw from counter-rotating. Also, if provided with a retainer, the assembly may be held into the panel by pressing or swaging the retainer, such that the screw is prevented from falling out by the retainer.

The present invention is a specialized captive fastener that can work with a counterbore to secure the fastener from the opposite side of a panel, and also allows the fastener to enter a subpanel.

SUMMARY OF THE INVENTION

The present invention is a captive fastener such as a threaded screw having a longitudinal slot along the shank for receiving a hold out clip. The shank further comprises two cavities that each house a respective push out clip. The push out clips each have a hook portion formed at the distal end that can engage an edge of the panel and fix the fastener at the edge of the panel. The push out clips may be spaced one hundred eighty degrees apart in a preferred embodiment, and act as leaf springs to apply an outward force against the panel. These push out clips steady the fastener during installation and resist movement as the panels are secured.

These, and other features of the invention will best be understood with reference to the figures and the detailed description of the invention below.

DETAILED DESCRIPTION OF THE PREFERRED EMBODIMENTS

Figure 1:
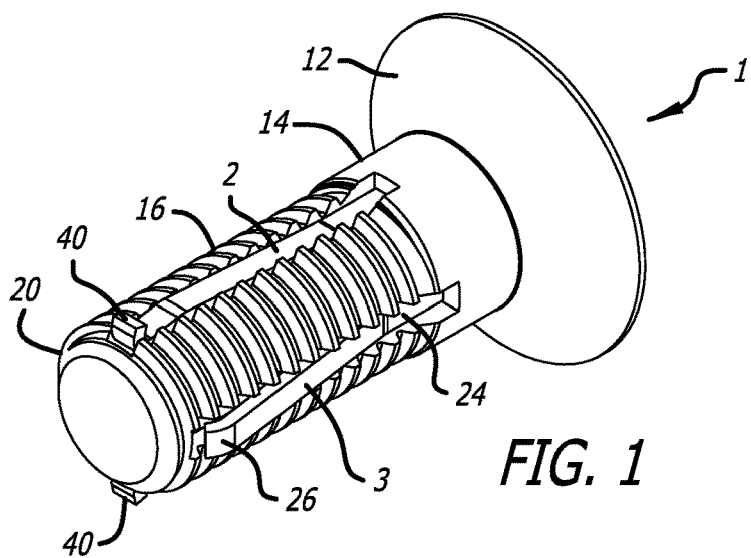
FIG. 1 is an elevated, perspective view of a first embodiment of the present invention.

The present invention relates to a captive fastener with a hold out clip and dual push out clips. FIG. 1 illustrates a first preferred embodiment of the present invention, comprising a fastener 1 having a head 12, a neck 14, and a threaded shank 16. The shank 16 is formed with a first elongate slot 5 extending from a position spaced from the end 20 of the shank to just beyond the juncture of the neck 14 and shank 16. The elongate slot 5 is sized to receive and retain a hold out clip 3, where the hold out clip 3 is cantilevered at a first end 24 to provides a free end 26 that slightly protrudes from the slot 5 at its distal end and acts as a leaf spring to apply an outward force against an interfering structure.

Figure 2:
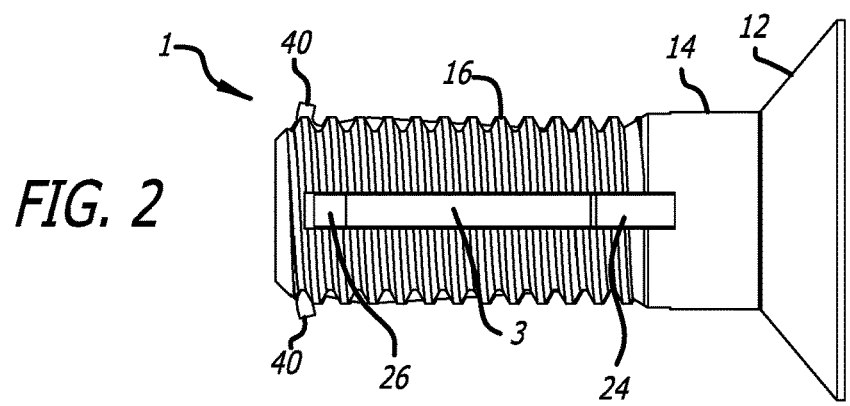
FIG. 2 is a front view of the embodiment of FIG. 1.
Figure 3:
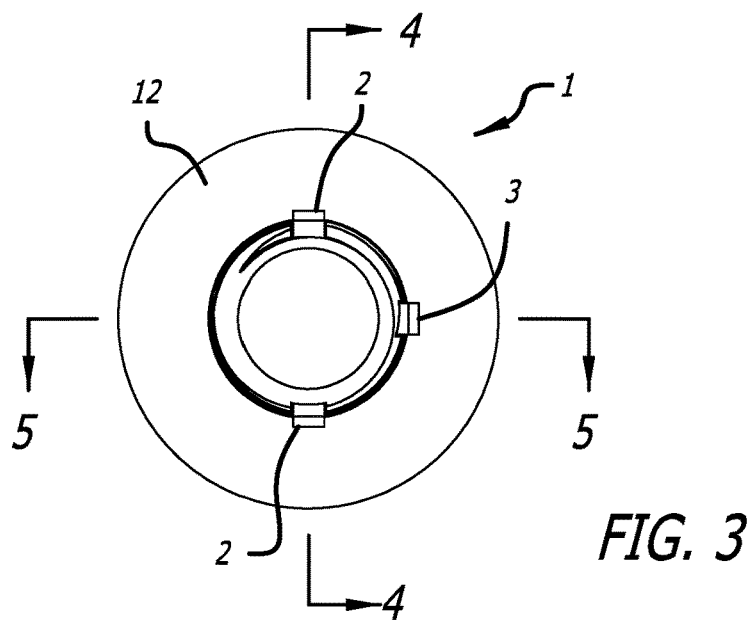
FIG. 3 is a side view of the embodiment of FIG. 1.

FIG. 2 illustrates the embodiment of FIG. 1 from the front view, showing the free ends 40 of the push out clips 2 protruding radially from the shank 16 of the fastener 1. The hold out clip similarly protrudes from the shank 16 at a ninety degree radial position with respect to the top push out clip 2. FIG. 3 shows the view looking down the shank 16, where the hold out clip 3 and the push out clips 2 are shown at ninety degrees of separation, although this is not necessary.

Figure 4:
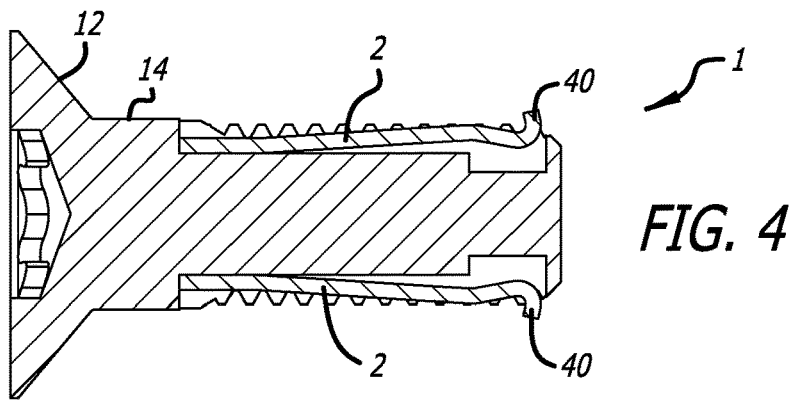
FIG. 4 is a cross-sectional view of the embodiment of FIG. 1 taken along line A-A of FIG. 3.
Figure 5:
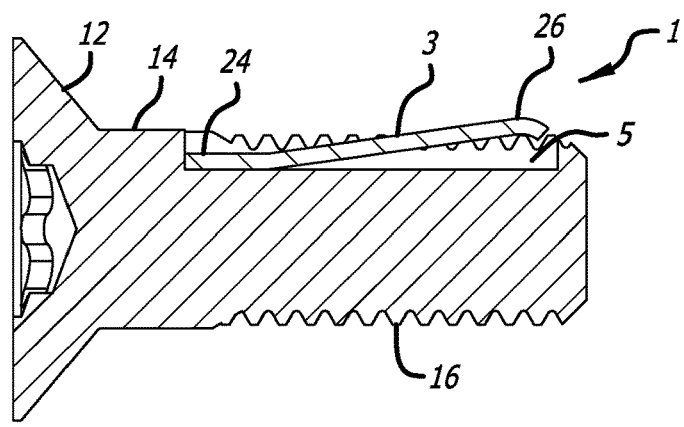
FIG. 5 is a cross-sectional view of the embodiment of FIG. 1 taken along line B-B of FIG. 3.

FIGS. 4 and 5 are a cross sectional views of the front and top of the fastener, respectively, that illustrate the hold out clip and the push out clips. The configuration of the hold out clip 3 within the slot 5 is shown in FIG. 5, where the depth of the slot 5 is adequate to allow the clip 3 to withdraw completely into the slot 5 in the presence of a radial force. The push out clips 2 have a curved leading edge that push the push out clips 2 inward in the presence of an interfering structure applying a longitudinal force, as would occur when the fastener is inserted into a panel opening. The push out clips 2 are mounted in slots 4 that have an enlarged recess at the distal end for receiving the hook shaped free ends 40 of the push out clips when the push out clips 2 are forced into the shank 16 of the fastener 1. The hook shaped free ends 40 of the push out clips define an arc that is preferably more than ninety degrees to ensure a secure engagement with the mating panel.

Figure 6:
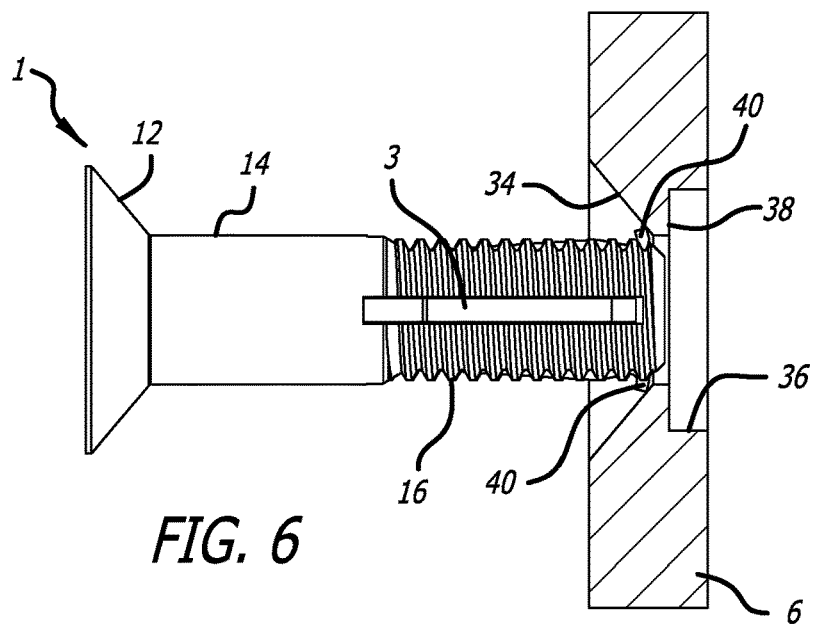
FIG. 6 is a front view, partially in cut-away, of the embodiment of FIG. 1 entering a panel.

FIGS. 6-13 illustrate the operation of the preferred embodiments of the invention. FIG. 6 shows the fastener 1 inserted into a primary or top panel 6 that may have a beveled recess 34 to receive the head 12 of the fastener 1. Opposite the beveled recess 34 is a counterbore 36, and in between the counterbore 34 and the beveled recess 34 is a circular aperture sized to receive the neck 14 of the fastener 1. As the fastener enters the beveled recess 34 and passes through the circular aperture, the bowed shape of the hold out clip 3 and the hook shaped free ends 40 of the push out clips 2 interfere with the inner surface of the circular aperture, which drives the hold out clip 3 into the slot 5 against the outward leaf spring bias. Similarly, the free ends 40 of the push out clips 2 bear against the circular aperture which causes the push out clips to be driven against the bias of the outward leaf spring force to recede into the respective slots 4. The receding of the push out clips 2 and the clip 3 into the slots 4 and 7, respectively, permits the fastener 1 to enter and pass through the panel 6.

Figure 7:
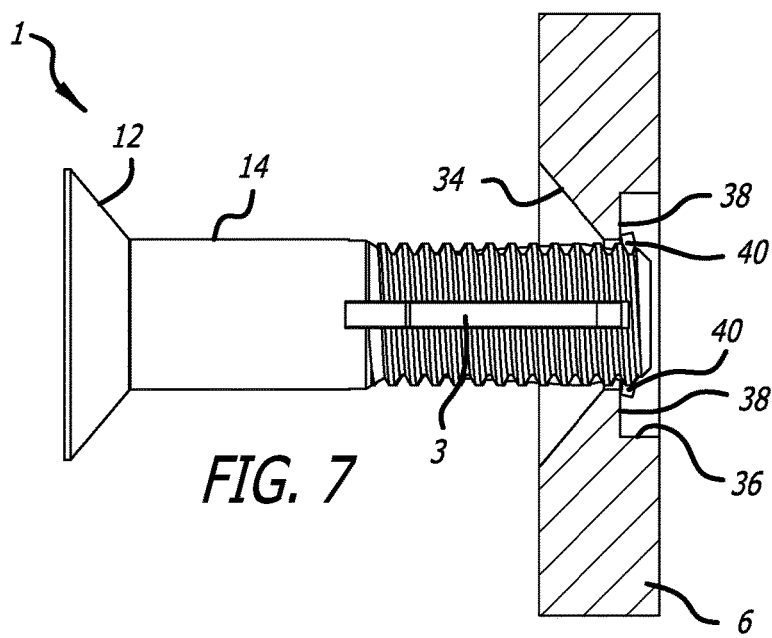
FIG. 7 is a front view, partially in cut-away, of the embodiment of FIG. 1 having the push out clips cleared of the panel outer surface.
Figure 8:
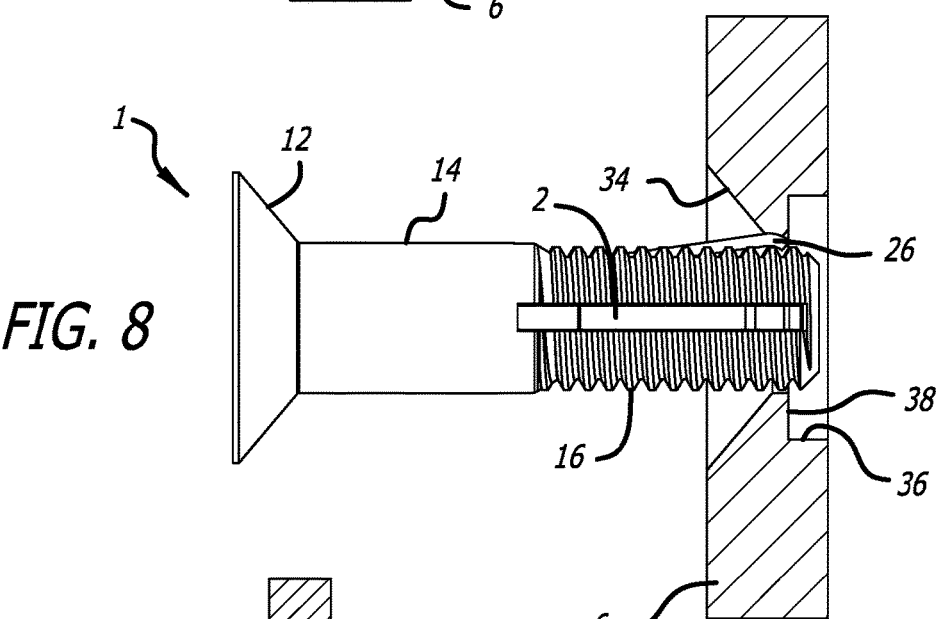
FIG. 8 is a top view, partially in cut-away, of the embodiment of FIG. 1 having the push out clips cleared of the panel outer surface.

FIGS. 7 and 8 illustrate the fastener 1 just after the distal end 20 passes through the circular aperture of the panel 6. The hold out clip 3 bears against the inner wall of the circular aperture while the free ends 40 of the push out clips 2 extend from the circular aperture and engage the outer surface 38 of the panel 6, holding the fastener 1 in place and establishing the depth of the free end 26 in the counterbore 36.

Figure 9:
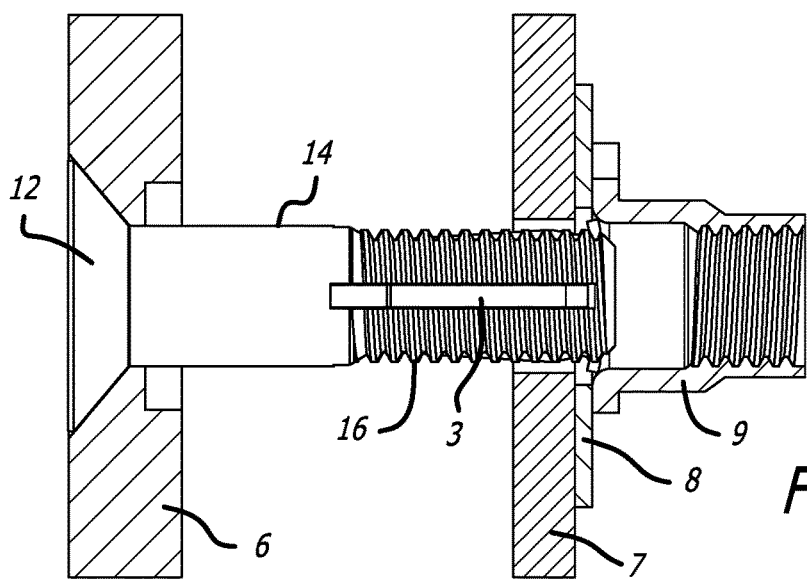
FIG. 9 is a front view, partially in cut-away, of the embodiment of FIG. 1 entering a subpanel with the lock nut engaged.
Figure 10:
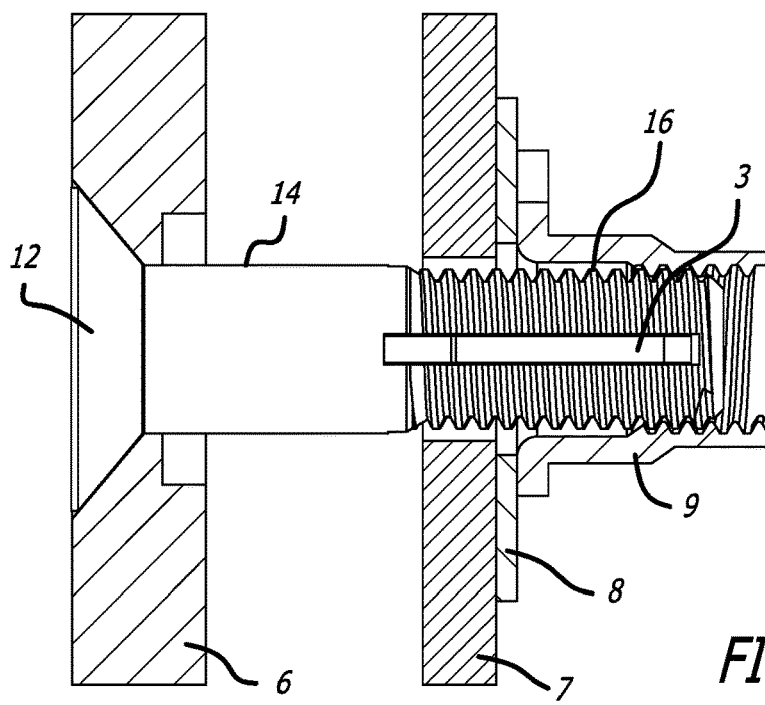
FIG. 10 is a front view, partially in cut-away, of the embodiment of FIG. 1 with nut attached.
Figure 11:
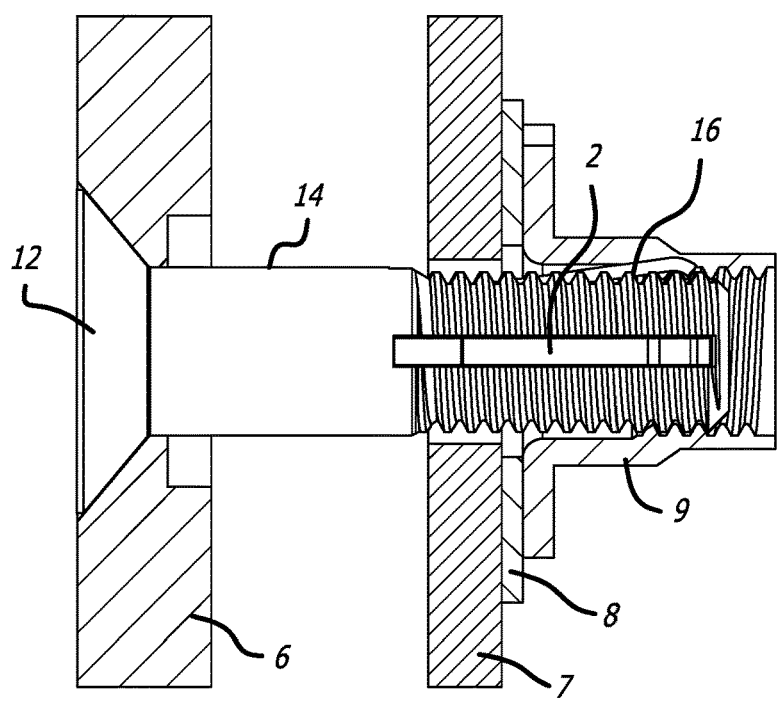
FIG. 11 is a top view, partially in cut-away, of the embodiment of FIG. 1 with nut attached.

FIG. 9 shows the progress of the fastener completely through the panel, such that the head 12 of the fastener 1 is engaged and mated with the beveled recess 34 of the panel 6, and the shank extends from the side of the panel substantially perpendicular to the surface 38 of the panel. The fastener 1 has passed through a second panel 7 and a nut bracket 8 and lock nut 9 have been applied to the distal end. The push out clips 2 and the lock out clip 3 have been collapsed into their respective slots as the end of the fastener enters and passes through the second panel 7. The nut bracket 8 and lock nut 9 keep the clips collapsed and retained inside the shank 16. FIGS. 10 and 11 illustrate the fastener continuing to move through the second panel, showing the top and front views.

Figure 12:
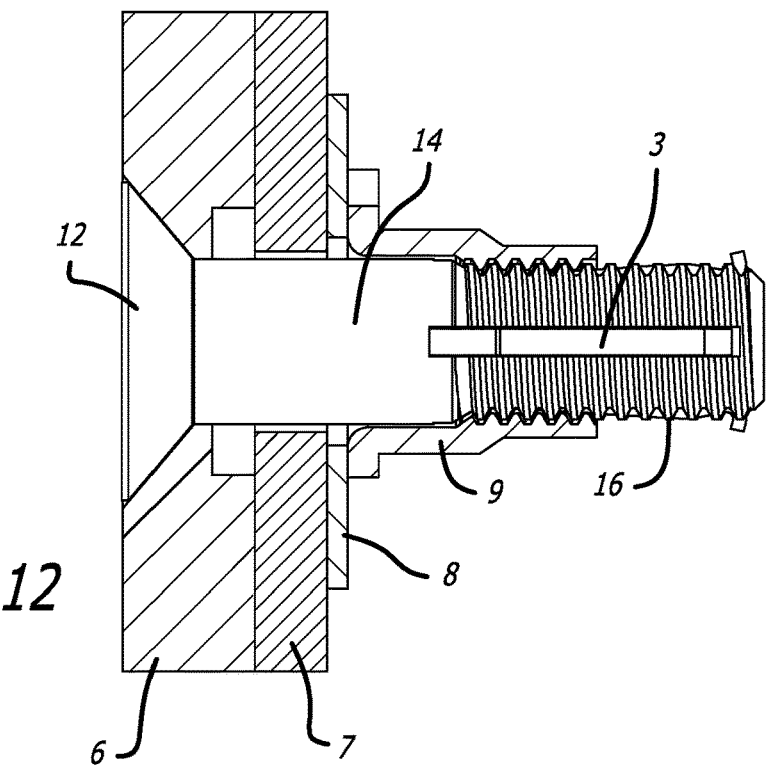
FIG. 12 is a front view, partially in cut-away, of the installed fastener of FIG. 1.
Figure 13:
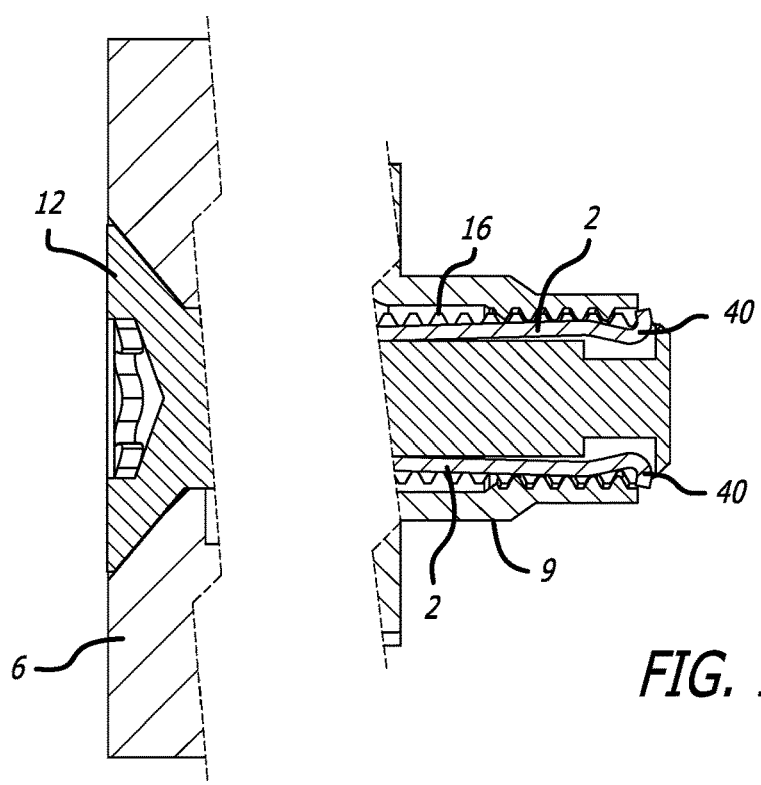
FIG. 13 is a sectional view of the end of the fastener with the nut attached.

FIG. 12 illustrates the primary panel 6 and second panel 7 are compressed by the fastener 1 and the lock nut 12 is fully engaged. Finally, FIG. 13 illustrates the hump of the push out clips at the distal end that allows the push out clips 2 to withdraw into their respective slots when the nut is removed, permitting the disengagement of the nut from the fastener.

Although a first preferred embodiment has been disclosed and depicted, the invention is not limited to any specific embodiment and should not be limited in any manner unless expressly stated.

We claim:

1. A captive fastener having a head, a neck, and a threaded shaft, the fastener further comprising:
    a first elongate slot along the shaft and sized to retain a cantilevered hold out clip partially extending outside the first elongate slot, the slot having a depth to receive the hold out clip entirely within; and
    a first and second cantilevered push out clips disposed within respective elongate slots in the threaded shaft, the first and second cantilevered push out clips radially extendable outside the threaded shaft and formed with hook shaped distal ends, the respective elongate slots each sized to receive the push out clips and having an increased depth at a distal end for the hook shaped distal ends.

2. The captive fastener of claim 1, wherein the push out clips are spaced one hundred eighty degrees apart.

3. The captive fastener of claim 1, wherein the hold out clip has a distal end that is concave inward, and the push out clips have distal ends that are concave outward.

4. The captive fastener of claim 1, wherein the hold out clip and push out clips are substantially of a common length.

5. The captive fastener of claim 1, wherein the hook members define an arc of more than ninety degrees.

* * * * *